000
United States Patent Office 3,444,154
Patented May 13, 1969

3,444,154
PROCESS FOR REACTING A DIOLEFINIC POLYMER WITH POLYHALOCYCLOPENTADIENE AND PRODUCTS THEREOF
Malcolm H. Shatz, Tonawanda, N.Y., assignor to Hooker Chemical Corporation, Niagara Falls, N.Y., a corporation of New York
No Drawing. Filed May 28, 1965, Ser. No. 459,897
Int. Cl. C08f *15/06;* C09k *3/28*
U.S. Cl. 260—94.7
5 Claims

ABSTRACT OF THE DISCLOSURE

A polymer is produced by a process which comprises (1) mixing an (a) olefinic polymer solution (b) polyhalocyclopentadiene and (c) water to make an emulsion, (2) heating the resulting emulsion until the desired polymer is obtained and (3) recovering the polymer.

The polymers of this invention find use in coating compositions and as a fire retardant additive.

---

This invention relates to a new process for producing polymers from a diolefinic polymer and polyhalocyclopentadiene.

Polymers which are the reaction products of a diolefinic polymer with polyhalocyclopentadiene have been found to be very useful in the preparation of adhesives, coating materials and impregnation of fibers where fire retarding properties are desirable. However, the processes for preparing these polymers involve the use of solvents which must be recovered if the processes are to be efficient and economical. Among the solvents proposed for use in preparing these polymers has been a large excess of the polyhalocyclopentadiene and also aromatic solvents such as toluene, xylene, and benzene. The method employing an excess of polyhalocyclopentadiene produces a very viscous solution which has to be exposed to air during part of the reaction cycle to reduce the viscosity of the medium to a more reasonable or workable level. The use of aromatic solvents avoids the viscosity problem but requires very careful control to retain the highly volatile solvents. In each case the resulting polymer must then be recovered by complex techniques. There has now been found a convenient and economical process for preparing such polymers.

In accordance with this invention there is provided a process for preparing polymers by (1) making an emulsion by mixing an (a) olefinic polymer with (b) polyhalocyclopentadiene and (c) water, (2) heating the emulsion until the desired polymer is obtained and (3) recovering the polymer.

The polymers used in the practice of the invention are substantially linear, unsaturated, homopolymers of diolefin monomers such as butadiene, methyl butadiene, dimethyl butadiene, cyclohexadiene, cyclopentadiene, and methyl cyclopentadiene. The polymers are soluble in such solvents as benzene, toluene, xylene, chloroform, polyhalocyclopentadiene, and carbon tetrachloride. The preferred polymers of the invention are the homopolymers of butadiene. Many processes are available for the preparation of such polymers, for example, by solution, emulsion and mass polymerization techniques. One such process involves polymerizing 1,3-butadiene in the presence of a catalyst composition comprising (a) an organo metal compound corresponding to the formula:

$$R_nM$$

wherein R is an alkyl radical containing up to and including 12 carbon atoms; M is a metal selected from the group consisting of mercury and zinc; and $n$ is an integer equal to the valence of the metal M; and (b) titanium tetraiodide. The polymer produced by this process contains from about 85 percent up to about 93 percent and higher cis 1,4-addition. Typical of the organo metal compounds contemplated are: dimethylmercury, diethylmercury, diiosbutylmercury, dihexylmercury, dimethylzinc, diethylzinc, dibutylzinc, and dioctylzinc. The amount of organo metal compound used in the catalyst composition is usually within the range of 1 to 50 moles per mole of titanium tetraiodide, while the concentration of the total catalyst composition is usually in the range of 0.05 to 10 weight percent based on the total amount of 1,3-butadiene charged into the polymerization reactor. The polymerization of butadiene can be carried out in a temperature range of —80 to 150 degrees centigrade in the presence of a hydrocarbon diluent such as benzene, toluene, xylene, normal hexane, isooctane, normal decane, cyclohexane, methylcyclohexane and mixtures thereof. At the completion of the polymerization reaction, the catalyst is inactivated, the rubbery polymer is precipitated from solution with an alcohol, and is then separated from the diluent by suitable means such as filtration. The other diolefinic polymers of the invention are produced by such catalytic processes, and even in the absence of catalysts. In noncatalytic processes, more drastic conditions of temperature and pressure are employed. In the production of catalytic polymers, various types of catalysts can be employed, including organic peroxides, metal oxides, and alkali metals such as sodium. By employing various temperatures, pressures, catalysts, and monomer concentrations, the properties of the reactant are varied as required by the ultimate utility of the product.

The polyhalogenated cyclopentadienes of this invention are of the formula

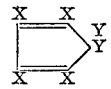

wherein X is selected from the group consisting of bromine, chlorine and fluorine and Y is selected from the group consisting of bromine, chlorine, fluorine, alkyl and alkoxy. The aforementioned alkyl and alkoxy groups generally have 1 to 10 carbon atoms and preferably have 1 to 6 carbon atoms. Illustrative of the polyhalogenated cyclopentadienes suitable for use in this invention are hexachlorocyclopentadiene, dichlorotetrabromocyclopentadiene, 5,5-dimethoxytetrachlorocyclopentadiene, hexabromocyclopentadiene, 5,5-difluorotetrachlorocyclopentadiene, hexafluorocyclopentadiene, 5,5-dibromotetrachlorocyclopentadiene, methylpentachlorocyclopentadiene, 5,5-diethoxytetrachlorocyclopentadiene, ethylpentachlorocyclopentadiene, beta-chloroethylpentachlorocyclopentadiene, propylpentachlorocyclopentadiene and butylpentachlorocyclopentadiene.

The diolefinic polymers of this invention may be employed in a solution form. The polymer solution may be prepared by dissolving the solid polymer in an organic solvent such as an aromatic or halocarbon or polyhalocyclopentadiene solvent or by employing certain aliphatic ketone solvents. Among the suitable aromatic and halocarbon solvents for use in the process of this invention are benzene, toluene, xylene, pseudo-cumene, hexachlorocyclopentadiene and acetylene tetrachloride. Also useful as solvents are isopropylbenzene, diisopropylbenzene, tetrachloroethane, chlorobenzene, dichlorobenzene, methylbutylketone, methylethylketone, cyclohexanone, 2-methoxyethyl acetate, benzyl ether, and dibutylphthalate. The quantity of solvent used will vary from about 10 to about 250 percent of the weight of the polymer starting material depending on the viscosity and solubility of the polymer in the selected solvent.

Emulsions are a substantially permanent heterogeneous liquid mixture of two or more liquids or liquids and solids which are not normally mutually soluble in each other but are held in suspension, one in the other, by mechanical agitation or by small amounts of additional substances known as emulsifiers. It has been found advantageous in this invention to use a combination of both mechanical agitation and small amounts of emulsifiers to obtain the desirable balance of properties, however, either one or both may be used within the scope of this invention. Emulsification by mechanical agitation may generally be obtained through the use of conventional emulsifying equipment. When emulsifiers are employed the surface-active agents employed may be those such as sulfonated oils, polyhydric alcohol esters and ethers, soaps, mahogany soaps, i.e., the sodium salts of sulfonic acids of petroleum refining sludge, sorbitan fatty acid esters and other fatty acid esters. The foregoing enumeration is only a partial tabulation of useful anionic and nonionic surfactants which are satisfactory for use in this invention. Among the more preferred emulsifiers are the alkyl aryl sulfonates and fatty acid esters. It is often desirable to use a combination of emulsifiers so that a desired hydrophile-lipophile balance is achieved thereby insuring a more stable emulsion. Emulsifiers in an amount up to about 10 percent by weight of the total mixture and preferably from 3 to 7 percent may be used.

The process of this invention is carried out by charging into a reaction vessel the polymer solution, polyhalocyclopentadiene and water. To this mixture may also be added emulsifiers. The mixture is then agitated until the desired emulsion is created. The weight of polyhalocyclopentadiene charged per weight of olefinic polymer employed in the processes of this invention is not critical and may be varied in order to achieve a particular polymer. From about 0.9 mole to about 3.0 moles of polyhalocyclopentadiene per mole of olefinic polymer may be used. However, it is preferred that from about 0.95 to about 2.0 moles of polyhalocyclopentadiene be employed for each mole of olefinic unsaturation in the olefinic polymer.

Alternatively, the diolefinic polymer may be first emulsified or made into a water based latex and then reacted with the polyhalocyclopentadiene as previously described. The polymer-water emulsified product may be prepared in advance and stored until convenient to react it with the polyhalocyclopentadiene.

The reaction mixture is agitated, thoroughly dispersed and thereafter allowed to react. The reaction may be carried out at suitable temperature from about room temperature to about 250 degrees centigrade. The reaction may be carried out at such a temperature at which the reaction mixture is gently boiling and the more volatile components may be returned to the reaction mixture by the condensation action of a reflux condenser. A preferred temperature range is from about 75 to about 200 degrees centigrade. The preferred process is carried out at atmospheric or autogeneous pressure. The reaction mixture is allowed to react at such a temperature and for such a length of time as required to achieve the degree of adduction of polyhalocyclopentadiene to the olefinic polymer. The reaction is allowed to continue for such a period as from about ½ hour to about 24 hours, depending to an extent upon the exact temperature employed. Suitable times of reaction are from about 4 to 16 hours. Throughout the reaction the emulsion viscosity remains essentially that of water.

After the reaction has proceeded to the desired degree of completion the polymer is conveniently recovered from the emulsion by pouring the emulsion into an aliphatic solvent such as an alkane or alkanol of 1 to 20 carbon atoms. The polymeric reaction product precipitates from the mixture and at the same time is separated from any excess polyhalocyclopentadiene which has not been reacted. Thereafter, the liquids are decanted from the solid polymer. The solid polymers may then be further washed and/or dried. The polymer is conveniently dried at a temperature of about 50 to 100 degrees centigrade and under vacuum, usually from 400 to 15 millimeters of mercury absolute pressure, for a period of 5 to 30 minutes. Among the various aliphatic solvents suitable for use in this recovery process are isopropyl alcohol and ethyl alcohol, and other alcohols such as amyl.

The process of this invention is characterized by improvements in reactions over processes wherein solution of reactants are employed. The low viscosity of the emulsion facilitates convenient reaction, compared to the high viscosities of polymer solutions.

The invention is illustrated by the following nonlimiting examples. Temperatures are expressed in degrees centigrade and parts are by weight unless otherwise indicated.

EXAMPLE 1

Into a reaction vessel equipped with a water condenser and a gas inlet were charged 54.1 parts of poly cis-1,4-butadiene (Cis-4 Rubber, Phillips Chemical Co.) dissolved in 683 parts of toluene, 273 parts of hexachlorocyclopentadiene, 3000 parts of water, 31 parts of polyoxyethylene esters of mixed fatty and rosin acids (Atlas Renex 20, Atlas Chemical Industries) and 19 parts of alkyl aryl sulfonate (Atlas G3300, Atlas Chemical Industries). The mixture was stirred and the various constituents were thereby emulsified in the water. The emulsion was heated at 100 degrees centigrade for 6 hours. The polymer formed was recovered by precipitating the emulsion in isopropyl alcohol, after which it was washed and vacuum dried. Total chlorine in the polymer was found to be 2.4 percent by weight.

EXAMPLE 2

In the example a high pressure autoclave having a magnetic dasher as the means of agitation was employed. The dasher was agitated at the rate of 4 cycles per second. To this autoclave were charged 27 parts of poly-cis-1,4-butadiene (Ameripol CB, Goodrich Gulf Chemicals) dissolved in 515 parts of toluene, 150 parts of hexachlorocyclopentadiene, 00.14 part of 4,4'-bis(2,6-ditertiary butyl phenol), 0.47 part of dibutyltin dilaurate, 10.2 parts of sorbitan monopalmitate (Span 40, Atlas Chemical Industries), 24.4 parts of polyoxyethylene (20) sorbitan monopalmitate (Tween 40, Atlas Chemical Industries) and 1018 parts of water. The autoclave was sealed, evacuated of air, and heated with agitation at 160 degrees centigrade for 6 hours under autogeneous pressure. Thereafter the autoclave was cooled to about 30 degrees centigrade. The polymer was then recovered from the emulsion as in Example 1. Total chlorine contained in this polymer was 36.85 percent. Intrinsic viscosity (normalized) 0.98.

EXAMPLE 3

To a three necked round bottom flask equipped with a stirrer, water cooled condenser and a nitrogen inlet tube were charged 27 parts of cis-1,4-polybutadiene and 136.4 parts of hexachlorocyclopentadiene. The mixture was heated on a steam bath for several hours until the cis-1,4-polybutadiene was dissolved. To this solution was added a mixture of 136.4 parts of hexachlorocyclopentadiene and 4.5 parts of sorbitan monopalmitate. The mixture was thoroughly agitated. Then a mixture of 395 parts of water and 10.5 parts of polyoxyethylene (20) sorbitan monopalmitate was blended into the mixture and the hydrocarbon material thus emulsified in the water. The emulsion was charged to a 1 liter Parr bomb (autoclave). The bomb had installed through its head a tandem stirrer, thermo well and a cooling coil. The bomb was sealed and the air evacuated, after which it was heated to 160 degrees and maintained at that temperature for 6 hours. Autogeneous pressures achieved were approximately 115 pounds per square inch. After the autoclave cooled, the polymer was recovered from the emulsion in Example 1. Total chlorine contained in this polymer was 60.5 percent. Approximately 67.9 percent of the ethylenic unsaturation of the polybutadiene was adducted. Intrinsic viscosity 0.45 (in toluene at 30 degrees).

EXAMPLE 4

Using the procedure of Example 3 a polymer was prepared using (1) a mixture comprised of 21.6 parts of cis-1,4-polybutadiene and 109 parts of hexachlorocyclopentadiene, (2) a mixture of 218 parts of hexachlorocyclopentadiene and 5.2 parts of sorbitan monopalmitate, and (3) a mixture of 400 parts of water and 12.2 parts of polyoxyethylene (20) sorbitan monopalmitate. Total chlorine contained in this polymer was 63 percent. Approximately 82.9 percent of the ethylenic unsaturation of the polybutadiene was adducted. Intrinsic viscosity 0.43 (in toluene at 30 degrees).

EXAMPLE 5

Using the procedure of Example 3 a polymer was prepared using (1) a mixture comprised of 37.8 parts of cis-1,4-polybutadiene and 190.9 parts of hexachlorocyclopentadiene, (2) a mixture comprised of 95.5 parts of hexachlorocyclopentadiene, 4.7 parts of sorbitan monopalmitate and 68.2 parts of alkylaryl polyether alcohol, and (3) a mixture comprised of 400 parts of water and 11.5 parts of polyoxyethylene (20) sorbitan monopalmitate. Total chlorine contained in this polymer was 60.0 percent. Approximately 66.2 percent of the ethylenic unsaturation of the polybutadiene was adducted. Intrinsic viscosity 0.41 (in toluene at 30 degrees).

EXAMPLE 6

A polymer was prepared by preparing a mixture of 54.1 parts of cis-1,4-polybutadiene and 272.8 parts of hexachlorocyclopentadiene. To this mixture was added 4.7 parts of sorbitan monopalmitate and 16.3 parts of alkylaryl polyether alcohol. The mixture was well mixed. Then a mixture of 400 parts of water and 11.6 parts of polyoxyethylene was added to the polybutadiene mixture and an emulsion prepared. The emulsion was then reacted in the manner of Example 3. Total chlorine contained in this polymer was 55.6 percent. Approximately 49.3 percent of the ethylenic unsaturation of the polybutadiene was adducted.

The resulting polymers produced above may be conveniently massed by extruding into prills which are then suitable for dry blending with other polymers or direct use in molding equipment to make useful thermoplastic articles. The polymers of this invention when admixed with other polymers such as polypropylene makes the resulting blend fire retardant.

The polymers of this invention may also be dissolved in solvent and blended with modifiers and pigments to produce useful coating compositions.

Similar polymers are prepared when other polyhalocyclopentadienes such as dichlorotetrabromocyclopentadiene, hexabromocyclopentadiene, dimethyltetrachlorocyclopentadiene and diethoxytetrachlorocyclopentadiene are employed in place of hexachlorocyclopentadiene.

Various changes and modifications may be made in the method of this invention and in the composition ratios of this invention, certain preferred forms which have been described. Equivalents may be substituted without departing from the spirit and scope of this invention and these modifications are to be regarded as within the scope thereof.

What is claimed is:

1. A process for preparing a polymer which comprises (1) agitating a mixture of (a) a solution of a substantially linear, unsaturated homopolymer of a diolefin monomer (b) polyhalocyclopentadiene and (c) water to make an emulsion, (2) heating the resulting emulsion at a temperature from about room temperature to about 250 degrees centigrade until the desired polymer is obtained and (3) recovering the polymer.

2. A process for preparing a polymer which comprises (1) mixing (a) a hydrocarbon solvent solution of a substantially linear, unsaturated homopolymer of a diolefinic monomer with (b) polyhalocyclopentadiene, (c) water and (d) an emulsifier to make an emulsion, (2) heating the resulting emulsion at a temperature from about room temperature to about 250 degrees centigrade until the desired polymer is obtained and (3) recovering the polymer.

3. A process for preparing a polymer which comprises (1) agitating a mixture of (a) a solution of a polybutadiene polymer having at least about 85 percent of cis-1,4 configuration (b) hexahalocyclopentadiene and (c) water to make an emulsion, (2) heating the resulting emulsion at a temperature from about 75 degrees to about 200 degrees centigrade until the desired polymer is obtained and (3) recovering the polymer.

4. A process for preparing a polymer which comprises (1) mixing (a) a hydrocarbon solvent solution of a polybutadiene polymer having at least about 85 percent of cis-1,4 configuration with (b) hexachlorocyclopentadiene, (c) water and (d) an emulsifier to make an emulsion, (2) heating the resulting emulsion at a temperature from about 75 degrees to about 200 degrees centigrade until the desired polymer is obtained and (3) recovering the polymer.

5. A process for preparing a polymer which comprises (1) agitating a mixture of (a) a substantially linear unsaturated homopolymer of a diolefin monomer (b) polyhalocyclopentadiene and (c) water to an emulsion, (2) heating the resulting emulsion at a temperature from about room temperature to about 250 degrees centigrade until the desired polymer is obtained and (3) recovering the polymer.

References Cited

UNITED STATES PATENTS

| | | | |
|---|---|---|---|
| 3,098,058 | 7/1963 | Schweiker et al. | 260—94.7 |
| 3,268,475 | 8/1966 | Hoch et al. | 260—45.9 |
| 3,330,817 | 7/1967 | Rinehart | 260—94.7 |
| 2,080,558 | 5/1937 | Carothers | 260—92.3 |
| 2,917,495 | 12/1959 | Cobb et al. | 260—85.1 |
| 3,325,464 | 6/1967 | Weil | 260—94.2 |

JOSEPH L. SCHOFER, *Primary Examiner.*

W. F. HAMROCK, *Assistant Examiner.*

U.S. Cl. X.R.

260—93.1, 96